(12) United States Patent
Kang et al.

(10) Patent No.: US 12,283,744 B2
(45) Date of Patent: Apr. 22, 2025

(54) METHOD AND DEVICE FOR SHARING DC-TO-DC CONVERTER BETWEEN ANTENNA MODULES

(71) Applicant: SAMSUNG ELECTRONICS CO., LTD., Suwon-si (KR)

(72) Inventors: Jihee Kang, Suwon-si (KR); Junghwan Son, Suwon-si (KR); Namjun Cho, Suwon-si (KR); Hyoseok Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 18/311,599

(22) Filed: May 3, 2023

(65) Prior Publication Data

US 2023/0275339 A1   Aug. 31, 2023

Related U.S. Application Data

(63) Continuation of application No. PCT/KR2021/015385, filed on Oct. 29, 2021.

(30) Foreign Application Priority Data

Nov. 4, 2020   (KR) .................. 10-2020-0146104

(51) Int. Cl.
*H01Q 1/38*   (2006.01)
*H01Q 1/24*   (2006.01)
*H04B 1/40*   (2015.01)

(52) U.S. Cl.
CPC ............... *H01Q 1/243* (2013.01); *H01Q 1/38* (2013.01); *H04B 1/40* (2013.01)

(58) Field of Classification Search
CPC ............. H01Q 1/243; H01Q 1/38; H04B 1/40
USPC ........................................ 343/904, 905, 906
See application file for complete search history.

(56) References Cited

U.S. PATENT DOCUMENTS

| | | | |
|---|---|---|---|
| 10,177,838 B2 | 1/2019 | Ripley |
| 10,211,728 B2 | 2/2019 | Hu et al. |
| 10,432,093 B2 | 10/2019 | Cheng et al. |
| 10,554,294 B2 | 2/2020 | Ripley |

(Continued)

FOREIGN PATENT DOCUMENTS

| | | |
|---|---|---|
| CN | 107431427 A | 12/2017 |
| KR | 20080064986 A | 7/2008 |

(Continued)

OTHER PUBLICATIONS

International Search Report for PCT/KR2021/015385 mailed Feb. 8, 2022, 3 pages.

(Continued)

*Primary Examiner* — William Hernandez
(74) *Attorney, Agent, or Firm* — Nixon & Vanderhye, P.C.

(57) ABSTRACT

An electronic device may include a low drop output regulator (LDO); a first DC-to-DC converter; an antenna module including an antenna array IC and an antenna array; a second DC-to-DC converter disposed outside the antenna module and supplying power to the low drop output regulator; a power generation circuit for supplying power to the first DC-to-DC converter and the second DC-to-DC converter; and a processor operatively coupled to the antenna module, the second DC-to-DC converter, and the power generation circuit.

20 Claims, 12 Drawing Sheets

(56) References Cited

U.S. PATENT DOCUMENTS

| | | | |
|---|---|---|---|
| 10,797,391 B2 | 10/2020 | Lee et al. | |
| 11,069,956 B2 | 7/2021 | Kim et al. | |
| 2007/0001652 A1 | 1/2007 | Ogawa | |
| 2009/0200985 A1 | 8/2009 | Zane et al. | |
| 2013/0270924 A1 | 10/2013 | Mori et al. | |
| 2016/0268885 A1 | 9/2016 | Kumar | |
| 2019/0199434 A1 | 6/2019 | Ripley | |
| 2019/0307028 A1 | 10/2019 | Yazaki | |
| 2020/0036083 A1* | 1/2020 | Kim | H01Q 1/243 |
| 2020/0220572 A1* | 7/2020 | Kwon | H04M 1/026 |
| 2021/0351503 A1 | 11/2021 | Miyagawa et al. | |

FOREIGN PATENT DOCUMENTS

| | | | |
|---|---|---|---|
| KR | 20160137803 A | 12/2016 |
| KR | 20200012106 A | 2/2020 |
| KR | 20200058153 A | 5/2020 |
| WO | 2020153068 A1 | 7/2020 |

OTHER PUBLICATIONS

Written Opinion of the ISA for PCT/KR2021/015385 mailed Feb. 8, 2022, 4 pages.

\* cited by examiner

[a]

METHOD AND DEVICE FOR SHARING DC-TO-DC CONVERTER BETWEEN ANTENNA MODULES

CROSS-REFERENCE TO RELATED APPLICATIONS

This application is a continuation of International Application No. PCT/KR2021/015385, designating the United States, filed on Oct. 29, 2021, in the Korean Intellectual Property Receiving Office and claiming priority to Korean Patent Application No. 10-2020-0146104, filed on Nov. 4, 2020 in the Korean Intellectual Property Office. The disclosures of each of these applications are incorporated by reference herein in their entireties.

BACKGROUND

Field

The disclosure relates to a method and a device for sharing a DC-to-DC converter between antenna modules.

Description of Related Art

A next-generation communication system may provide a flexible system structure and functions that enable various services having different requirements to operate in one system. For example, a 5G communication system may use the mm-Wave frequency band (20 GHz or higher) to achieve a transmission rate that is about 10 times higher than that of the existing 4G. In order to support the mm-Wave frequency band, an electronic device may include an antenna module in which an antenna (or antenna array), a transceiver, and a power management integrated circuit (PMIC) are integrated into one. The PMIC is used to supply a power source (or power) to the antenna module, and multiple elements (e.g., an inductor and a capacitor) may be included to drive the PMIC.

In a case that an antenna module is placed adjacent to a side surface of an electronic device to increase radiation efficiency of the antenna module, the height of the antenna module may serve as a factor of determining the thickness of the electronic device. For example, the height of the antenna module may refer to shorter sides among two pairs of parallel sides in a case that a printed circuit board included in the antenna module has a rectangular shape. In order to reduce the thickness of the electronic device, development is undergoing in the direction of decreasing the height of the antenna module. For example, in a case of reducing the number or size of one or more circuits (or electronic components) included in the antenna module, the height of the antenna module may be reduced. However, the size of elements configured to drive the PMIC included in the antenna module is not reduced, and thus the height of the antenna module may be difficult to be reduced.

SUMMARY

Various embodiments of the disclosure may provide a method and a device capable of decreasing the height of an antenna module by disposing, outside the antenna module, one DC-to-DC converter among two DC-to-DC converters included in a power supply circuit (e.g., a PMIC) configured to drive the antenna module.

An electronic device according to various example embodiments may include an antenna module including a low-dropout regulator (LDO), a first DC-to-DC converter, an antenna array IC, and an antenna array, a second DC-to-DC converter disposed outside the antenna module and configured to supply power to the low-dropout regulator, a power generation circuit configured to supply power to the first DC-to-DC converter and the second DC-to-DC converter, and a processor operatively connected to the antenna module, the second DC-to-DC converter, and the power generation circuit, wherein the second DC-to-DC converter is configured to establish an electrical path for receiving a feedback signal from the low-dropout regulator.

An electronic device according to various example embodiments may include a first antenna module including a first low-dropout regulator, a first DC-to-DC converter, a first antenna array IC, and a first antenna array, a second antenna module including a second low-dropout regulator, a second DC-to-DC converter, a second antenna array IC, and a second antenna array, a third DC-to-DC converter disposed outside the first antenna module and the second antenna module and configured to supply a first power to the first low-dropout regulator and supply a second power to the second low-dropout regulator, a power generation circuit configured to supply power to the first DC-to-DC converter, the second DC-to-DC converter, and the third DC-to-DC converter, and a processor operatively connected to the first antenna module, the second antenna module, the third DC-to-DC converter, and the power generation circuit, wherein the third DC-to-DC converter is configured to establish a first electrical path for receiving a first feedback signal from the first low-dropout regulator and a second electrical path for receiving a second feedback signal from the second low-dropout regulator.

According to various example embodiments, a method for operating an electronic device including one or more antenna modules, and a DC-to-DC converter disposed outside the antenna module and configured to supply power to low-dropout regulators included in the one or more antenna modules, respectively, wherein the DC-to-DC converter is configured to establish an electrical path for receiving a feedback signal from each of the low-dropout regulators, the method including obtaining a feedback signal from at least one antenna module, comparing a current voltage of a low-dropout regulator included in the acquired feedback signal with a target voltage, and controlling power supplied to each low-dropout regulator from the DC-to-DC converter, based on a result of the comparison.

According to various embodiments, one DC-to-DC converter among two DC-to-DC converters, which are included in a power supply circuit (e.g., PMIC) configured to drive an antenna module, is disposed outside the antenna module and only one DC-to-DC converter is included in the antenna module, so that the height of the antenna module can be reduced.

According to various embodiments, other circuits (or components) included in the antenna module may be arranged in a space reserved for the size of a DC-to-DC converter and multiple elements required to drive the DC-to-DC converter to decrease the height of the antenna module.

According to various embodiments, only one DC-to-DC converter may be included in the antenna module, and cost savings can be obtained due to removal of other DC-to-DC converters and elements.

According to various embodiments, by receiving feedback of input power from low-dropout regulators (LDOs) included in one or more antenna modules respectively, and controlling the power input from a DC-to-DC converter disposed on a main circuit board to the low-dropout regulator (LDO), the output of the DC-to-DC converter disposed on the main circuit board can be shared with one or more antenna modules.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
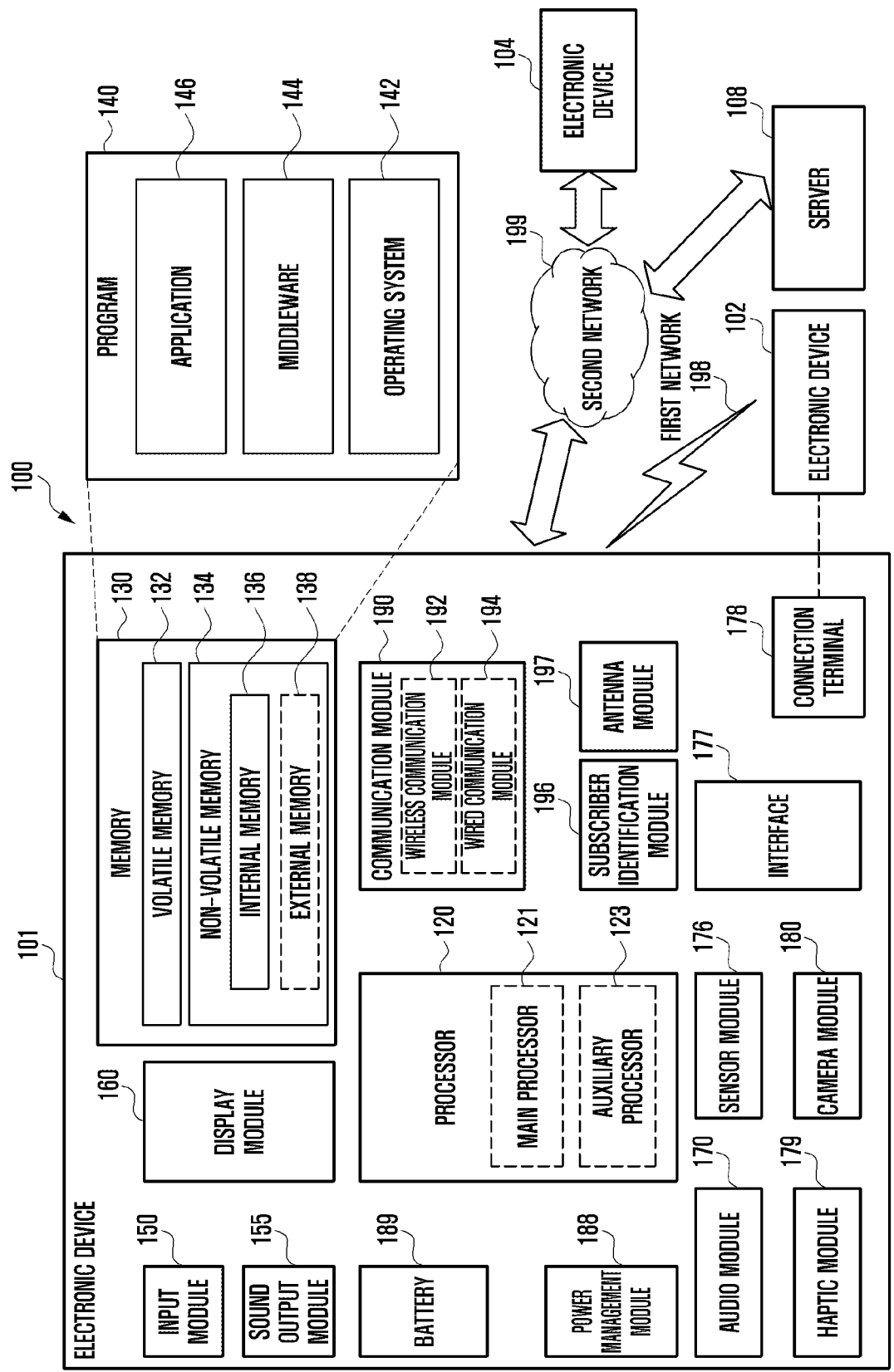
FIG. 1 is a block diagram of an example electronic device in a network environment according to various embodiments.

The electronic device according to certain embodiments may be one of various types of electronic devices. The electronic devices may include, for example, a portable communication device (e.g., a smart phone), a computer device, a portable multimedia device, a portable medical device, a camera, a wearable device, a home appliance or the like. According to an embodiment of the disclosure, the electronic devices are not limited to those described above.

It should be appreciated that example embodiments of the present disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
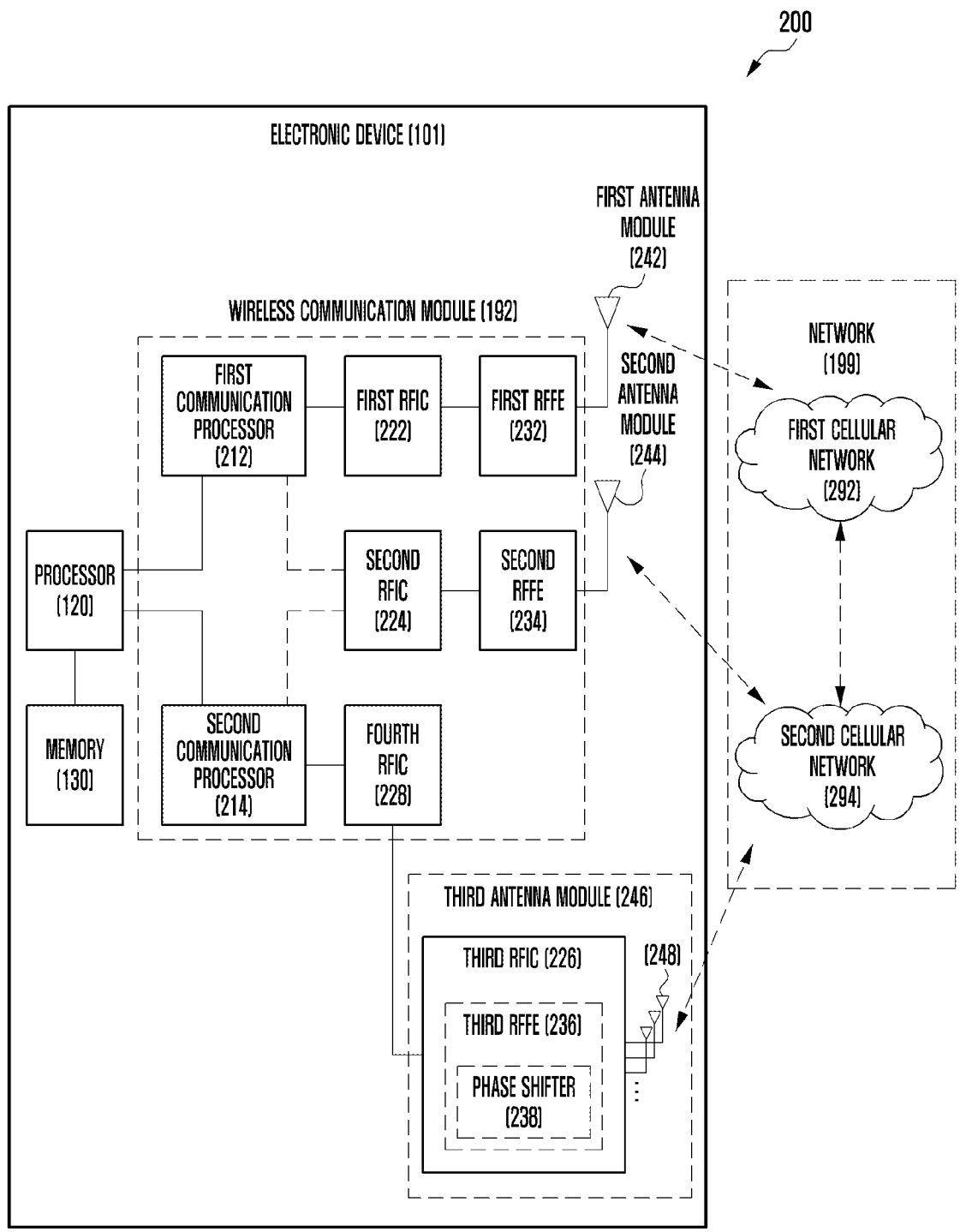
FIG. 2 is a block diagram of an example electronic device for supporting legacy network communication and 5G network communication according to various embodiments.

FIG. 2 is a block diagram 200 illustrating an example electronic device 101 for supporting legacy network communication and 5G network communication according to various embodiments.

Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, and an antenna 248. The electronic device 101 may further include a processor (e.g., including processing circuitry) 120 and a memory 130.

The network 199 may include a first network (e.g., a legacy network) 292 and a second network (e.g., a 5G network) 294. According to an embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or included as a part of the third RFIC 226.

The first communication processor 212 may include various communication processing circuitry and support establishment of a communication channel in a band to be used for wireless communication with the first network 292, and legacy network communication through the established communication channel. According to various embodiments, the first network may be a legacy network including, for example, and without limitation, a 2G, 3G, 4G, or long term evolution (LTE) network. The second communication processor 214 may support establishment of a communication channel corresponding to a designated band (for example, about 6 GHz to about 60 GHz) among bands to be used for wireless communication with the second network 294, and, for example, and without limitation, 5G network communication through the established communication channel. According to various embodiments, the second network 294 may, for example, be a 5G network as referenced by third generation partnership project (3GPP).

Additionally, according to an embodiment, the first communication processor 212 or the second communication processor 214 may support establishment of a communication channel corresponding to another designated band (for example, about 6 GHz or lower) among the bands to be used for wireless communication with the second network 294, and, for example, 5G network communication through the established communication channel According to an embodiment, the first communication processor 212 and the second communication processor 214 may be implemented inside a single chip or a single package. According to various embodiments, the first communication processor 212 or the second communication processor 214 may, for example, be provided inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which may be used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that may be used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this example, the fourth RFIC 228 may convert a baseband signal generated by the second communication processor 214 into an RF signal in an intermediate frequency band (for example, about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment, the first RIFC 222 and the second RFIC 224 may, for example, be implemented as at least a part of a single chip or a single package. According to an embodiment, the first RFFE 232 and the second RFFE 234 may, for example, be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (for example, main PCB). In this example, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may, for example, include an antenna array including multiple antenna elements that may be used for beamforming. In this example, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include an access network (for example, 5G radio access network (RAN) or next-generation network (NG RAN)) and may not include a core network (for example, next-generation core (NGC)). In this example, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first communication processor 212, or the second communication processor 214).

Figure 3A:
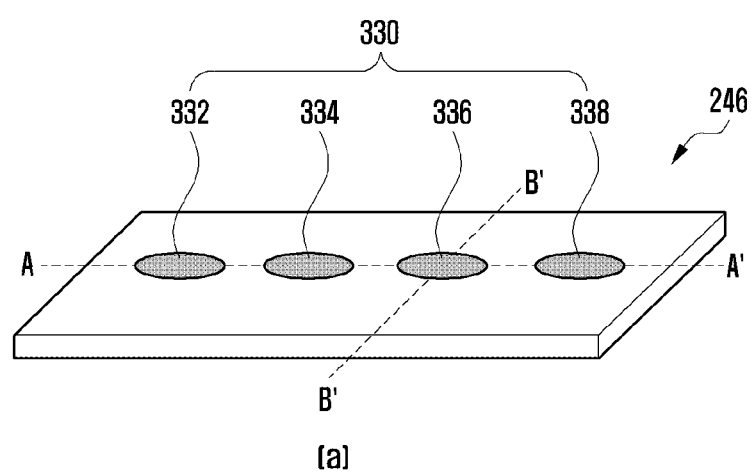
FIGS. 3A, 3B, and 3C illustrate an example structure of a third antenna module of FIG. 2 according to various embodiments.
Figure 3B:
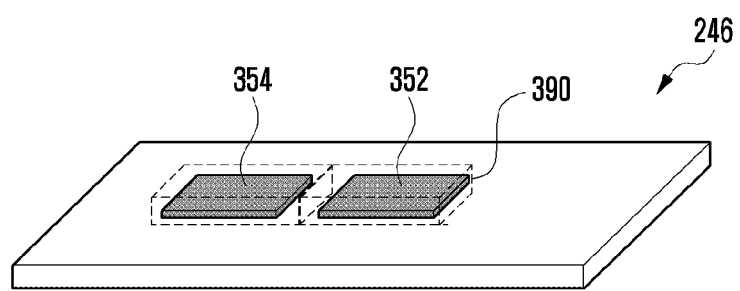
Figure 3C:
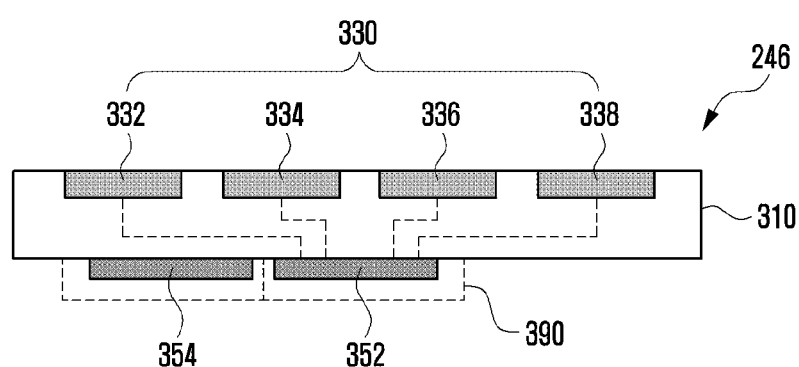

FIGS. 3A, 3B, and 3C illustrate an example structure of a third antenna module 246 of FIG. 2. For reference, FIG. 3A is a perspective view of the example third antenna module 246 viewed from one side, FIG. 3B is a perspective view of the example third antenna module 246 viewed from another side, and FIG. 3C is a cross-sectional view of the example third antenna module 246, taken along line A-A'.

Referring to FIGS. 3A, 3B, and 3C, in an embodiment, the third antenna module 246 may include a printed circuit board 310, an antenna array 330, a radio frequency integrated circuit 352 (RFIC), a power management integrated circuit (PMIC) 354, and a module interface 370. Optionally, the third antenna module 246 may further include a shield member 390. In an embodiment, at least one of the above-mentioned components may be omitted or at least two of the components may be integrally formed.

The printed circuit board 310 may include a plurality of conductive layers and a plurality of nonconductive layers alternately laminated on the conductive layers. The printed circuit board 310 may provide electrical connections between various electronic components disposed in the printed circuit board 310 and/or on the outside using wiring lines and conductive vias disposed on the conductive layers.

The antenna array 330 (e.g., 248 of FIG. 2) may include a plurality of antenna elements 332, 334, 336, or 338 disposed to form a directional beam. The antenna elements, as illustrated, may be disposed on a first surface of the printed circuit board 310. According to an embodiment, the antenna array 330 may be disposed in the interior of the printed circuit board 310. According to various embodiments, the antenna array 330 may include a plurality of antenna arrays (e.g., dipole antenna arrays and/or patch antenna arrays) of the same or different shapes or kinds.

The RFIC 352 (e.g., 226 of FIG. 2) may be disposed on another area (e.g., a second surface that is opposite to the first surface) of the printed circuit board 310, which is spaced apart from the antenna array. The RFIC 352 may be configured to process a signal of a selected frequency band, which is transmitted and received through the antenna array 330. According to an embodiment, the RFIC 352 may convert a baseband signal acquired from a communication processor (not illustrated) to an RF signal of a specific band when the baseband signal is transmitted. The RFIC 352 may convert the RF signal received through the antenna array 352 to a baseband signal and deliver the baseband signal to the communication processor when the RF signal is received.

According to an embodiment, the RFIC 352 may up-convert an IF signal (e.g., about 9 GHz to about 11 GHz) acquired from an intermediate frequency integrated circuit (IFIC) (e.g., 228 of FIG. 2) to an RF signal of a selected band when the IF signal is transmitted. The RFIC 352 may down-convert the RF signal acquired through the antenna array 330 to an IF signal and deliver the IF signal to the RFIC when the RF signal is received.

The PMIC 354 may be disposed in another partial area (e.g., the second surface) of the printed circuit board 310, which is spaced apart from the antenna array. The PMIC may receive a voltage from the main PCB (not illustrated), and may provide electric power that is necessary for various components (e.g., the RFIC 352) on the antenna module.

The shield member 390 may be disposed at a portion (e.g., the second surface) of the printed circuit board 310 to electromagnetically shield at least one of the RFIC 352 or the PMIC 354. According to an embodiment, the shield member 390 may include a shield can.

Although not illustrated, in various embodiments, the third antenna module 246 may be electrically connected to another printed circuit board (e.g., the main circuit board) through a module interface. The module interface may include a connection member, for example, a coaxial cable connector, a board-to-board connector, an interposer, or a flexible printed circuit board (FPCB). Through the connection member, the RFIC 352 and/or the PMIC 354 of the antenna module may be electrically connected to the printed circuit board.

Figure 4:
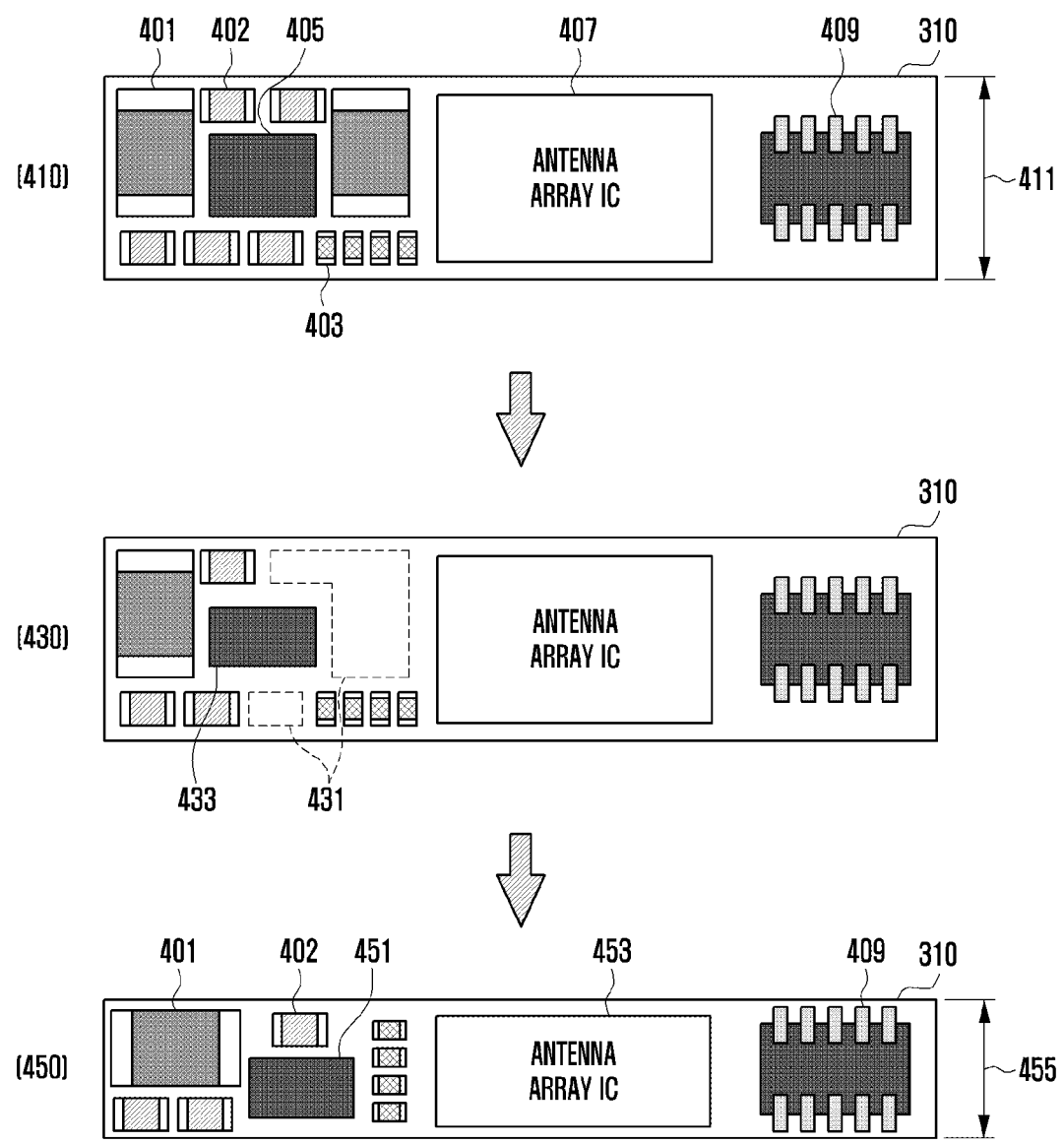
FIG. 4 illustrates an example of comparing antenna modules included in an example electronic device according to various embodiments.

FIG. 4 illustrates an example of comparing antenna modules included in an electronic device according to various embodiments.

Referring to FIG. 4, a first antenna module 410 is illustrated for a comparative example, and may include a printed circuit board (PCB) 310, a PMIC 405, and multiple elements 401, 402, and 403 configured to drive the PMIC 405, an antenna array IC 407 (e.g., the RFIC 352 in FIG. 3), and/or a connector 409. The drawing of FIG. 4 illustrates one surface (e.g., the second surface of the printed circuit board 310 of FIG. 3) of the first antenna module 410, a second antenna module 430, and a third antenna module 450, and an antenna array (e.g., the antenna array 330 of FIG. 3) may be included on another surface (e.g., the first surface of the printed circuit board 310) or a location adjacent to the other surface. The PMIC 405 may supply power to an element (e.g., the antenna array IC 407) included in the first antenna module 410.

An electronic device (e.g., the electronic device 101 of FIG. 1) may include a circuit board on which an interface PMIC (IF PMIC) is disposed. For example, the circuit board on which the interface PMIC (IF PMIC) is disposed may, for example, be referred to as a main circuit board. The IF PMIC (not shown) may receive a power source (or power) directly from a battery (e.g., the battery 189 of FIG. 1) and transfer the same to an element (e.g., the processor 120 of FIG. 1) included in the electronic device 101. For example, the IF PMIC may output (or supply) power to the PMIC 405 included in the first antenna module 410. The first antenna module 410 may be connected to the main circuit board of the electronic device 101 through the connector 409. The antenna array IC 407 (e.g., the RFIC 352 of FIG. 1) may be configured to process signals of a selected frequency band transmitted/received through the antenna array 330.

According to various embodiments, the PMIC 405 may include two DC-to-DC converters and/or a low-dropout regulator (LDO). The DC-to-DC converter may adjust (or control) a DC value and provide various voltages (e.g., 1.0V to 3V) required for the first antenna module 410. For example, a first DC-to-DC converter may supply power to an amplifier included in the antenna array IC 407, and a second DC-to-DC converter may supply power to the low-dropout regulator (LDO). The low-dropout regulator (LDO) may supply power to elements (e.g., a phase-locked loop (PLL), a low noise amplifier (LNA), a Tx driver amplifier, or a phase shifter) included in the antenna array IC 407, using the supplied power. The first antenna module 410 may include multiple elements 401, 402, and 403 to drive the DC-to-DC converter. For example, the multiple elements 401, 402, and 403 are elements such as inductors and capacitors, and thus there may be limitations in reducing the size of the multiple elements 401, 402, and 403. Due to the PMIC 405 and the multiple elements 401, 402, and 403, there may be a constraint in decreasing the height 411 (or size) of the first antenna module 410.

According to an example embodiment of the disclosure, one DC-to-DC converter among the two DC-to-DC converters included in the PMIC 405 may be removed and placed outside the antenna module. The second antenna module 430 and the third antenna module 450 may have modified structures according to various embodiments of the disclosure.

According to an embodiment of the disclosure, the second antenna module 430 is obtained by removing one DC-to-DC converter from the PMIC 433, and the size of the PMIC 433 may be smaller that of the PMIC 405 included in the first antenna module 410. For example, the DC-to-DC converter removed from the PMIC 433 may be disposed on the main circuit board of the electronic device 101. In addition, the second antenna module 430 may secure a space 431 occupied by multiple elements by removing an element required for driving the removed DC-to-DC converter. By securing the space 431, the arrangement structure or size (or height) of elements included in the module may be changed, as in the third antenna module 450.

According to various embodiments, the third antenna module 450 may include a PMIC 451, multiple elements 401 and 402 configured to drive the PMIC 451, an antenna array IC 453 (e.g., the RFIC 352 of FIG. 3), and/or a connector 409. Since the third antenna module 450 removes one DC-to-DC converter from the PMIC 451, the size of the PMIC 451 may be reduced and the number of elements required to drive the removed DC-to-DC converter may be reduced. Comparing the height 411 of the first antenna module 410 and the height 455 of the third antenna module 450 may result in identification of the height 455 of the third antenna module 450 being decreased.

Figure 5:
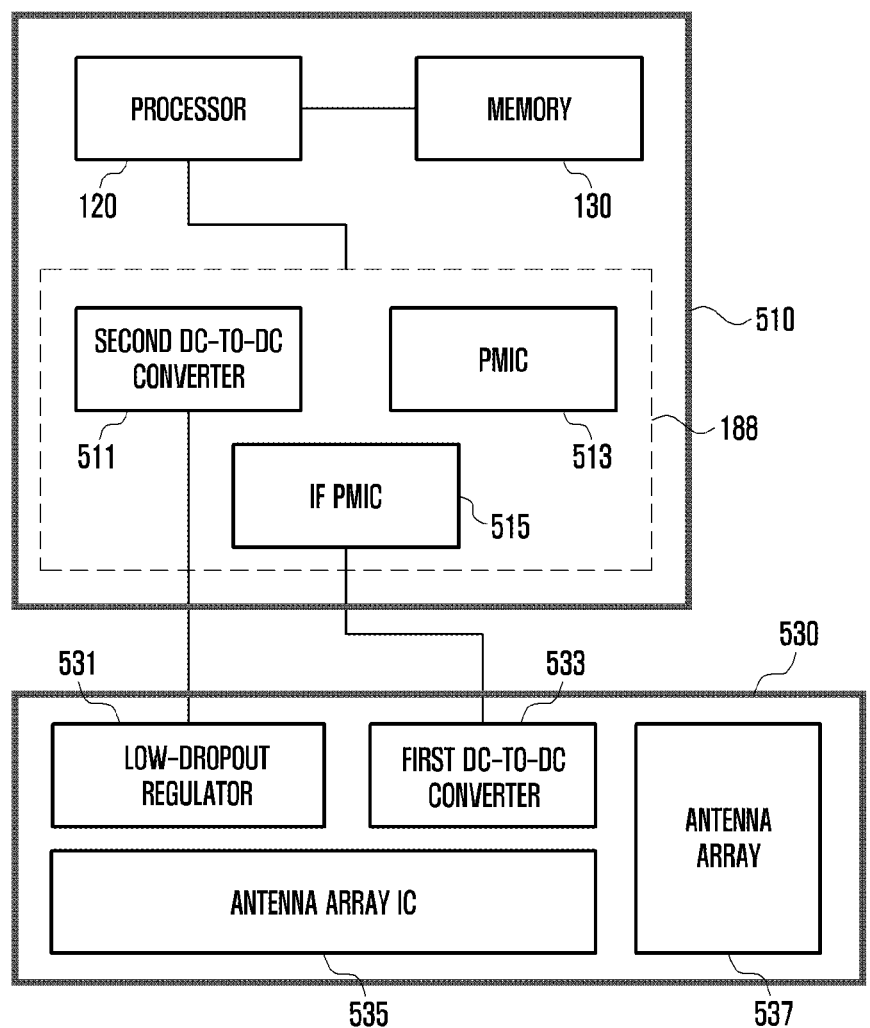
FIG. 5 is a block diagram of a main circuit board and an antenna module included in an example electronic device according to various embodiments.

FIG. 5 is a block diagram of a main circuit board and an antenna module included in an example electronic device according to various embodiments.

Referring to FIG. 5, an electronic device (e.g., the electronic device 101 of FIG. 1) according to various embodiments may include a processor 120, a memory 130, or a power generation circuit (e.g., the power management module 188 of FIG. 1) on a main circuit board 510. Although not shown, other elements included in the electronic device 101

(e.g., the input module 150 and the audio output module 155) may be included (or disposed) on the main circuit board 510.

According to an embodiment, the power management module 188 may include a second DC-to-DC converter 511, a PMIC 513, and/or an IF PMIC 515. The PMIC 513 is a main PMIC included in the electronic device 101, and may receive power through the IF PMIC 515 and supply a power source (or power) to an element (e.g., the processor 120) included in the electronic device 101. The IF PMIC 515 may be directly connected to a battery (e.g., the battery 189 of FIG. 1) and output power supplied from the battery 189. For example, the IF PMIC 515 may supply power to the second DC-to-DC converter 511, the PMIC 513, and/or a first DC-to-DC converter 533 included in the antenna module 530. The second DC-to-DC converter 511 may supply power to a low-dropout regulator (LDO) 531 included in the antenna module 530, using power supplied from the IF PMIC 515. In an embodiment, the second DC-to-DC converter 511 may be included in the PMIC 513 and configured as a single chip.

According to an embodiment, the antenna module 530 may include a low-dropout regulator 531, a first DC-to-DC converter 533, an antenna array IC 535, and/or an antenna array 537. Although not shown, the antenna module 530 may further include a connector (e.g., the connector 409 of FIG. 4) used to connect the antenna module to the main circuit board 510. The low-dropout regulator 531 is one of the elements included in the PMIC, and may receive power from the second DC-to-DC converter 511 disposed outside the antenna module 530 and supply the power to the antenna array IC 535. For example, the low-dropout regulator 531 may supply power to an element (e.g., a phase-locked loop (PLL), a low noise amplifier (LNA), a Tx driver amplifier, or a phase shifter) included in the antenna array IC 535, using the power supplied from the second DC-to-DC converter 511. The first DC-to-DC converter 533 may receive power from the IF PMIC 515 and supply the power to an amplifier (not shown, a power amplifier) included in the antenna array IC 535.

According to an embodiment, the antenna array IC 535 may correspond to the RFIC 352 of FIG. 3 and process signals of a frequency band transmitted/received through the antenna array 537 (e.g., the antenna array 330 of FIG. 3). According to an embodiment, the antenna array IC 535 may convert a baseband signal obtained from a communication processor (e.g., the first communication processor 212 of FIG. 2) into a radio frequency signal of a designated band during transmission. As another example, the antenna array IC 535 may convert an IF signal obtained from an IFIC (e.g., the fourth RFIC 228 of FIG. 2) into a radio frequency signal of a designated band during transmission. In an embodiment, the antenna array IC 535 may convert a radio frequency signal received through the antenna array 537 into a baseband signal and transmit the baseband signal to the communication processor during reception. As another example, the antenna array IC 535 may convert a radio frequency signal received through the antenna array 537 into an IF signal and transmit the IF signal to the IFIC (e.g., the fourth RFIC 228 in FIG. 2) during reception.

The power amplifier included in the antenna array IC 535, among elements included in the electronic device 101, may consume large power. Since a radio frequency signal transmitted through the antenna array 537 has severe signal attenuation or noise, power of the radio frequency signal may be amplified, when transmitting the radio frequency signal to a base station, in order to increase transmission efficiency due to signal attenuation or noise. The power amplifier may serve to amplify the radio frequency signal. For example, the first DC-to-DC converter 533 may provide power (e.g., 1.0V to 3.0V) for driving the power amplifier.

According to various embodiments, when an electrical path for connecting the first DC-to-DC converter 533 and the power amplifier becomes long, power consumed by the electrical path may occur. Since the first DC-to-DC converter 533 generates variable power, the efficiency of the power amplifier may decrease when power consumed by the electrical path is generated, and thus the first DC-to-DC converter may be disposed adjacent to the power amplifier.

The second DC-to-DC converter 511 may provide a fixed power source (e.g., 1.3V) to the low-dropout regulator 531. Since the second DC-to-DC converter 511 generates fixed power, a DC resistance constraint thereof may be lower than that of the first DC-to-DC converter 533. Although the second DC-to-DC converter 511 is not disposed adjacent to the antenna array IC 535, the second DC-to-DC converter may supply power by considering power consumed by an electrical path through which the second DC-to-DC converter 511 and the antenna array IC 535 are connected.

According to various embodiments, the second DC-to-DC converter 511 may be disposed outside the antenna module 530, and the low-dropout regulator 531 receiving power from the second DC-to-DC converter 511 may be disposed inside the antenna module 530. The low-dropout regulator 531 does not occupy a large space and may serve to supply low-noise power to the antenna array IC 535. The low-dropout regulator 531 may supply (or output) fixed power (e.g., about 1.1 V) to elements (e.g., a phase-locked circuit or low-noise amplifier) included in the antenna array IC 535 in addition to the power amplifier, using the power supplied from the second DC-to-DC converter 511. When the low-dropout regulator 531 is disposed outside the antenna array IC 535, the power output from the low-dropout regulator 531 may cause coupling with signals output from elements included in the main circuit board 510. The low-dropout regulator 531 may be disposed inside the antenna array IC 535.

According to various embodiments, the second DC-to-DC converter 511 may receive feedback of the current voltage used by the low-dropout regulator 531 and control the supplied voltage based on the fed back voltage. For example, the low-dropout regulator 531 may generate power to be provided to other elements included in the antenna array IC 535, using power supplied from the second DC-to-DC converter 511. The low-dropout regulator 531 may provide a feedback signal including the output power (e.g., a current voltage) to the second DC-to-DC converter 511. In an embodiment, an electrical path for transmitting a feedback signal may be established between the low-dropout regulator 531 and the second DC-to-DC converter 511.

According to various embodiments, the processor 120 may be configured to determine whether the current voltage included in the feedback signal exceeds a target voltage (e.g., a voltage supplied from the second DC-to-DC converter 511 to the low-dropout regulator 531). When the current voltage exceeds the target voltage, the processor 120 may be configured to control a pulse width modulation (PWM) generator (or PWM signal generator) to reduce a duty cycle of an input PWM signal of a buck converter included in the second DC-to-DC converter 511. As another example, the processor 120 may be configured to control the PWM generator to increase the duty cycle of the input PWM signal of the buck converter when the current voltage is equal to or less than the target voltage. The second DC-to- DC converter 511 may control (or adjust) the voltage provided to the low-dropout regulator 531 according to the control of the processor 120.

Figure 6A:
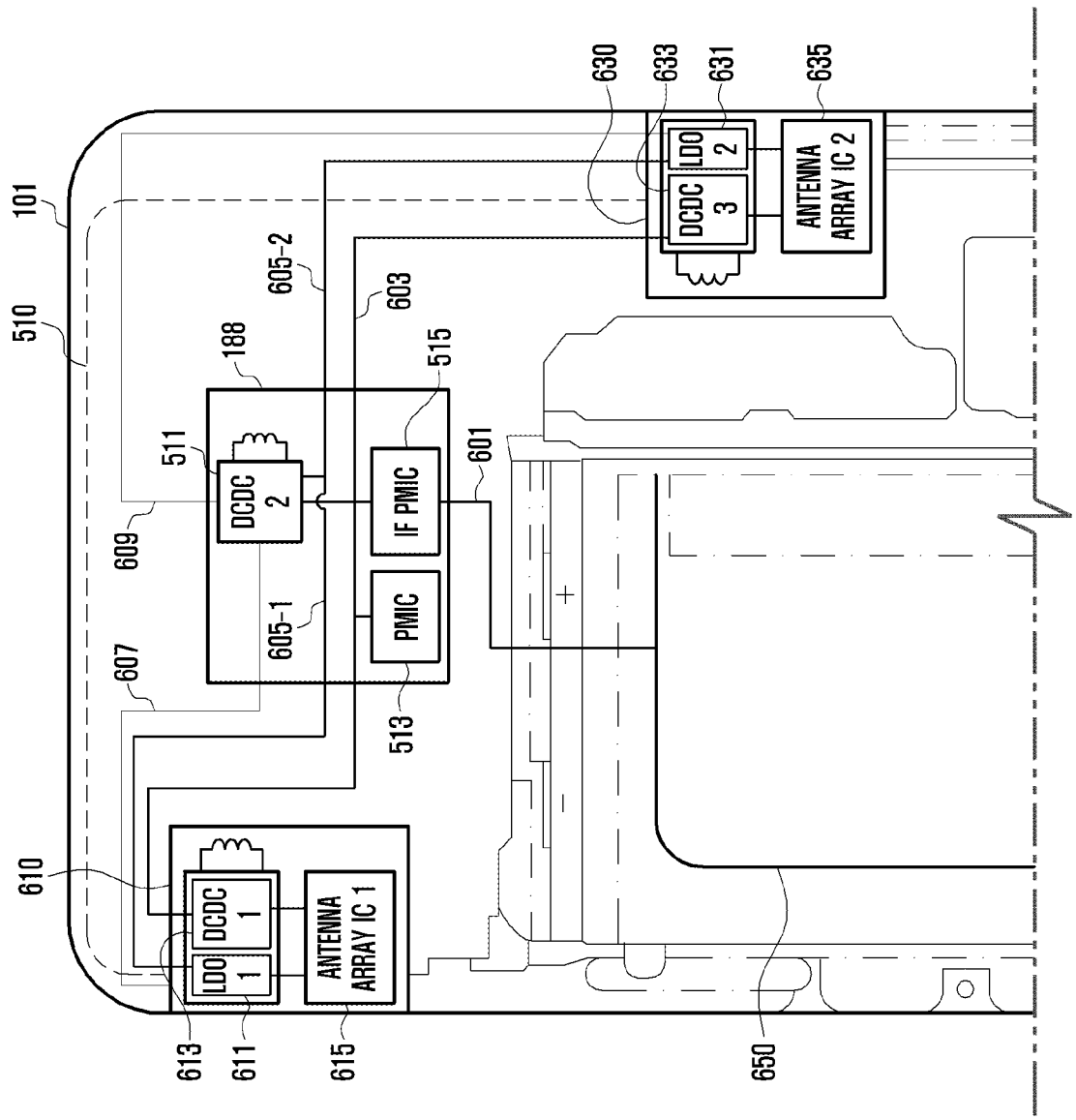
FIGS. 6A and 6B are configuration diagrams of a main printed circuit board and an antenna module of an example electronic device according to various embodiments.
Figure 6B:
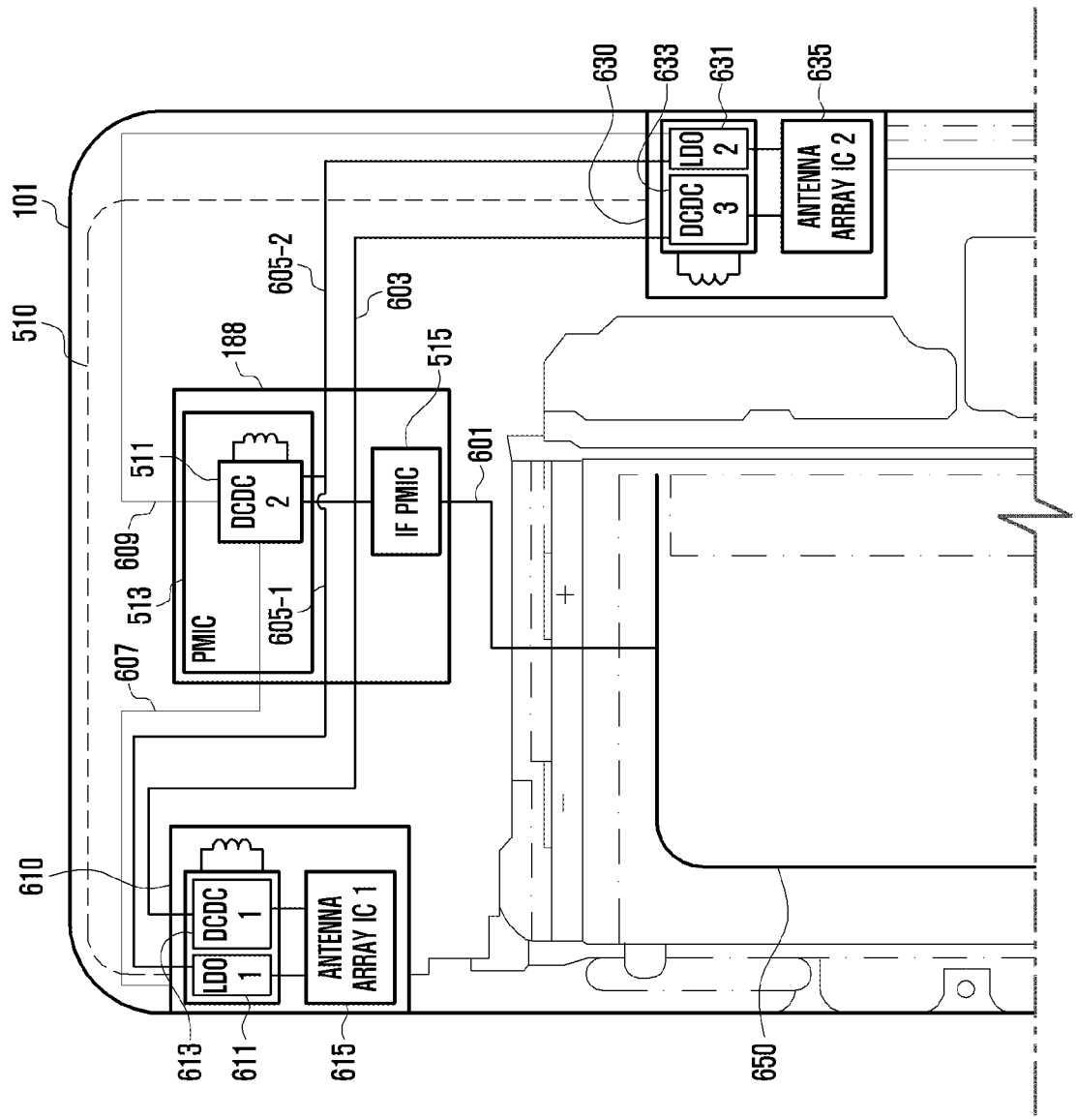

FIGS. 6A and 6B illustrate an example configuration diagram of a main printed circuit board and an antenna module of an example electronic device according to various embodiments.

FIG. 6A illustrates a first example configuration diagram of a main circuit board and an antenna module of an example electronic device according to various embodiments.

Referring to FIG. 6A, an electronic device (e.g., the electronic device 101 of FIG. 1) according to various embodiments may include a power generation circuit (e.g., the power management module 188 of FIG. 1) on a main circuit board 510, and may include a first antenna module 610 and a second antenna module 630. The first antenna module 610 and the second antenna module 630 may be electrically connected to the main circuit board 510 through a connector. Although not shown, other elements (e.g., the processor 120 and the memory 130) included in the electronic device 101 may be included (or disposed) on the main circuit board 510.

According to an embodiment, the power management module 188 may include a second DC-to-DC converter (DCDC2) 511, a PMIC 513, and/or an IF PMIC 515. For example, the second DC-to-DC converter 511 may be disposed separately from the PMIC 513 and the IF PMIC 515. The PMIC 513 is a main PMIC included in the electronic device 101, and may be supplied with power (VBAT) through the IF PMIC 515 and supply a power source (or power) to an element (e.g., the processor 120) included in the electronic device 101. The IF PMIC 515 may be connected to a battery 650 (e.g., the battery 189 of FIG. 1) through a first electrical path 601 and receive the power (VBAT) from the battery 650. The IF PMIC 515 may supply power (e.g., VPWR) to the second DC-to-DC converter 511 and the PMIC 513 through a second electrical path 603, using the power (e.g., VBAT) having been received from the battery 650. In addition, the IF PMIC 515 may supply power (e.g., VPWR) to the first DC-to-DC converter 613 included in the first antenna module 610 through the second electrical path 603, and may supply power (e.g., VPWR) to a third DC-to-DC converter (DCDC 3) 633 included in the second antenna module 630 through the second electrical path 603.

According to an embodiment, the second DC-to-DC converter 511 may supply power to a first low-dropout regulator 611 and a second low-dropout regulator 631, using the power (VBAT) supplied from the IF PMIC 515. For example, the second DC-to-DC converter 511 may supply (or output) a first power (e.g., VOUT1) to the first low-dropout regulator (LDO1) 611 included in the first antenna module 610 through a third electrical path 605-1, and may supply (or output) a second power (e.g., VOUT2) to the second low-dropout regulator (LDO2) 631 included in the second antenna module 630 through a fourth electrical path 605-2. The first power may be the same as or different from the second power, for example. As the third electrical path 605-1 and the fourth electrical path 605-2 on the main circuit board 510 are different, a difference in current consumption may occur. As another example, as the lengths (or distance) of the third electrical path 605-1 and the fourth electrical path 605-2 are different, a difference in current consumption may occur. As another example, a difference in current consumption may occur between the first low-dropout regulator 611 and the second low-dropout regulator 631 due to different operating conditions.

For example, an input voltage (V1) of the first low-dropout regulator 611 may be affected by at least one of the first power (e.g., VOUT1) output from the second DC-to-DC converter 511, a DC resistance (e.g., R1) generated on the third electrical path 605-1, or current (I1) consumed by the power output from the first low-dropout regulator 611 (e.g., V1=VOUT1−R1*I1). As another example, the input voltage (V2) of the second low-dropout regulator 631 may be affected by at least one of the second power (e.g., VOUT2) output from the second DC-to-DC converter 511, a DC resistance (e.g., R2) generated on the fourth electrical path 605-2, or current (2) consumed by the power output from the second low-dropout regulator 631 (e.g., V2=VOUT2−R2*I2). For example, the voltage V1 of the first low-dropout regulator 611 and the voltage V2 of the second low-dropout regulator 631 may be different.

According to various embodiments, the second DC-to-DC converter 511 may control the first power (e.g., VOUT1) based on the DC resistance (R1) generated on the third electrical path 605-1 of the first low-dropout regulator 611 or the consumption current (I1) of the first low-dropout regulator 611. As another example, the second DC-to-DC converter 511 may control the second power (e.g., VOUT2) based on the DC resistance (R2) generated on the fourth electrical path 605-2 of the second low-dropout regulator 631 or the consumption current (2) output from the second low-dropout regulator 631.

According to various embodiments, in order to effectively compensate for the difference in current consumption according to operating conditions of the first low-dropout regulator 611 and the second low-dropout regulator 631 while the common power generated by the second DC-to-DC converter 511 is transferred to the first low-dropout regulator 611 and the second low-dropout regulator 631 spaced apart from each other or the difference in DC resistance on the electrical path, a structure in which the second DC-to-DC converter 511 can receive feedback signals from the first low-dropout regulator 611 and the second low-dropout regulator 631 may be configured.

According to an embodiment, the second DC-to-DC converter 511 may receive a first feedback signal from the first low-dropout regulator 611 through a fifth electrical path 607. The second DC-to-DC converter 511 may receive a second feedback signal from the second low-dropout regulator 631 through a sixth electrical path 609. The first feedback signal may include, for example, a first current voltage (or voltage level) of the first low-dropout regulator 611. The first current voltage of the first low-dropout regulator 611 may be a voltage input to the first low-dropout regulator 611. The second feedback signal may include, for example, a second current voltage (or voltage level) of the second low-dropout regulator 631. The second DC-to-DC converter 511 may supply the first power (e.g., VOUT1) to the first low-dropout regulator 611 and supply the second power (e.g., VOUT2) to the second low-dropout regulator (LDO2) 631 according to the control of the processor 120.

According to various embodiments, the processor 120 may be configured to control the first power or second power output from the second DC-to-DC converter 511 based on whether the first antenna module 610 or the second antenna module 630 is activated (or used). For example, when only the first antenna module 610 is activated, the processor 120 may be configured to determine whether a first current voltage included in the first feedback signal exceeds a target voltage. For example, the target voltage may imply a voltage that the second DC-to-DC converter 511 should supply to the first low-dropout regulator 611, and the first current voltage may imply a voltage that the second DC-to-DC converter 511 currently supplies to the first low-dropout regulator 611. The processor 120 may be configured to control the PWM generator to reduce the duty cycle of the input PWM signal of the buck converter included in the second DC-to-DC converter 511 when the first current voltage exceeds the target voltage. When the first current voltage is equal to or less than the target voltage, the processor 120 may be configured to control the PWM generator to increase the duty cycle of the input PWM signal of the buck converter included in the second DC-to-DC converter 511.

In an embodiment, when only the second antenna module 630 is activated, the processor 120 may be configured to determine whether the second current voltage included in the second feedback signal exceeds the target voltage. For example, the target voltage may imply a voltage that the second DC-to-DC converter 511 should supply to the second low-dropout regulator 631, and the second current voltage may imply a voltage that the second DC-to-DC converter 511 currently supplies to the second low-dropout regulator 631. The processor 120 may be configured to control the PWM generator to reduce the duty cycle of the input PWM signal of the buck converter included in the second DC-to-DC converter 511 when the second current voltage exceeds the target voltage. When the second current voltage is equal to or less than the target voltage, the processor 120 may be configured to control the PWM generator to increase the duty cycle of the input PWM signal of the buck converter included in the second DC-to-DC converter 511.

According to various embodiments, the processor 120 may be configured to determine whether the first current voltage exceeds a target voltage or the second current voltage exceeds the target voltage when the first antenna module 610 and the second antenna module 630 are activated. The processor 120 may be configured to control the PWM generator to decrease the duty cycle of the input PWM signal of the buck converter included in the second DC-to-DC converter 511 when the first current voltage exceeds the target voltage and the second current voltage exceeds the target voltage. The processor 120 may be configured to control the PWM generator to increase the duty cycle of the input PWM signal of the buck converter included in the second DC-to-DC converter 511 when the first current voltage does not exceed the target voltage or the second current voltage does not exceed the target voltage.

According to an embodiment, the first antenna module 610 may include a first low-dropout regulator 611, a first DC-to-DC converter (DCDC1) 613, and a first antenna array IC (antenna array IC1) 615. The first DC-to-DC converter 613 may receive power (e.g., VPWR) supplied from the IF PMIC 515 and supply power to a first power amplifier included in the first antenna array IC 615 using the supplied power (e.g., VPWR).

According to an embodiment, the second antenna module 630 may include a second low-dropout regulator 631, a third DC-to-DC converter (DCDC3) 633, and a second antenna array IC (antenna array IC2) 635. The third DC-to-DC converter 633 may receive power (e.g., VPWR) supplied from the IF PMIC 515 and supply power to a second power amplifier included in the second antenna array IC 635 using the supplied power (e.g., VPWR).

According to various embodiments, the first antenna module 610 and the second antenna module 630 may receive power supplied from the second DC-to-DC converter 511 included in the main circuit board 510. The first low-dropout regulator 611 and the second low-dropout regulator 631 may share the output of the second DC-to-DC converter 511. For example, the first low-dropout regulator 611 may be supplied with (or receive) a first power (e.g., VOUT1) from the second DC-to-DC converter 511. The second low-dropout regulator 631 may be supplied with (or receive) a second power (e.g., VOUT2) from the second DC-to-DC converter 511. The first low-dropout regulator 611 may transfer (or transmit) a first feedback signal to the second DC-to-DC converter 511 through the fifth electrical path 607. The second low-dropout regulator 631 may transfer (or transmit) a second feedback signal to the second DC-to-DC converter 511 through the sixth electrical path 609.

FIG. 6B illustrates a second example configuration diagram of a main circuit board and an antenna module of an example electronic device according to various embodiments.

Referring to FIG. 6B, an electronic device 101 may include a power generation circuit (e.g., the power management module 188 of FIG. 1) on a main circuit board 510, and may include a first antenna module 610 and a second antenna module 630. The first antenna module 610 and the second antenna module 630 may be electrically connected to the main circuit board 510 through a connector. The power management module 188 may include a second DC-to-DC converter (DCDC2) 511, a PMIC 513, and an IF PMIC 515.

According to an embodiment, the second DC-to-DC converter 511 may be included in the PMIC 513 and configured as a single chip. The difference between the first configuration diagram of FIG. 6A and the second configuration diagram of FIG. 6B is that the second DC-to-DC converter 511 is disposed separately from the PMIC 513 or included in the PMIC 513. Since the remaining description is substantially the same as that of FIG. 6A, a detailed description is not repeated.

The PMIC 513 may be supplied with power (VBAT) through the IF PMIC 515 and supply a power source (or power) to an element (e.g., the processor 120) included in the electronic device 101. The IF PMIC 515 may be connected to a battery 650 (e.g., the battery 189 of FIG. 1) through a first electrical path 601 and receive the power (VBAT) supplied from the battery 650. The IF PMIC 515 may supply power (e.g., VPWR) to the second DC-to-DC converter 511, the PMIC 513, the first DC-to-DC converter 613 included in the first antenna module 610, and the third DC-to-DC converter (DCDC 3) 633 included in the second antenna module 630 through a second electrical path 603, by using the power (VBAT) having been received from the battery 650. In addition, the IF PMIC 515 may supply power (e.g., VPWR) to the first DC-to-DC converter 613 included in the first antenna module 610 through the second electrical path 603, and may supply power (e.g., VPWR) to a third DC-to-DC converter (DCDC 3) 633 included in the second antenna module 630 through the second electrical path 603.

According to an embodiment, the second DC-to-DC converter 511 may supply power to the first low-dropout regulator 611 and the second low-dropout regulator 631, using the power (VBAT) supplied from the IF PMIC 515. For example, the second DC-to-DC converter 511 may supply (or output) a first power (e.g., VOUT1) to the first low-dropout regulator (LDO1) 611 included in the first antenna module 610 through a third electrical path 605-1, and may supply (or output) a second power (e.g., VOUT2) to the second low-dropout regulator (LDO2) 631 included in the second antenna module 630 through a fourth electrical path 605-2.

According to an embodiment, the second DC-to-DC converter 511 may receive a first feedback signal from the first low-dropout regulator 611 through a fifth electrical path 607. The second DC-to-DC converter 511 may receive a second feedback signal from the second low-dropout regulator 631 through a sixth electrical path 609. The first feedback signal may include, for example, a first current voltage (or voltage level) of the first low-dropout regulator 611. The first current voltage of the first low-dropout regulator 611 may be a voltage input to the first low-dropout regulator 611. The second feedback signal may include, for example, a second current voltage (or voltage level) of the second low-dropout regulator 631. The second current voltage of the second low-dropout regulator 631 may be a voltage input to the second low-dropout regulator 631. The second DC-to-DC converter 511 may supply the first power (e.g., VOUT1) to the first low-dropout regulator 611 and supply the second power (e.g., VOUT2) to the second low-dropout regulator (LDO2) 631 according to the control of the processor 120.

According to various embodiments, when only the first antenna module 610 is activated, the processor 120 may be configured to determine whether a first current voltage included in the first feedback signal exceeds a target voltage. For example, the target voltage may imply a voltage that the second DC-to-DC converter 511 should supply to the first low-dropout regulator 611, and the first current voltage may imply a voltage that the second DC-to-DC converter 511 currently supplies to the first low-dropout regulator 611. The processor 120 may be configured to control the PWM generator to reduce the duty cycle of the input PWM signal of the buck converter included in the second DC-to-DC converter 511 when the first current voltage exceeds the target voltage. When the first current voltage is equal to or less than the target voltage, the processor 120 may be configured to control the PWM generator to increase the duty cycle of the input PWM signal of the buck converter included in the second DC-to-DC converter 511.

According to various embodiments, when only the second antenna module 630 is activated, the processor 120 may be configured to determine whether the second current voltage included in the second feedback signal exceeds the target voltage. For example, the target voltage may imply a voltage that the second DC-to-DC converter 511 should supply to the second low-dropout regulator 631, and the second current voltage may imply a voltage that the second DC-to-DC converter 511 currently supplies to the third low-dropout regulator 631. The processor 120 may be configured to control the PWM generator to reduce the duty cycle of the input PWM signal of the buck converter included in the second DC-to-DC converter 511 when the second current voltage exceeds the target voltage. When the second current voltage is equal to or less than the target voltage, the processor 120 may be configured to control the PWM generator to increase the duty cycle of the input PWM signal of the buck converter included in the second DC-to-DC converter 511.

According to various embodiments, the processor 120 may be configured to determine whether the first current voltage exceeds a target voltage or the second current voltage exceeds the target voltage when the first antenna module 610 and the second antenna module 630 are activated. The processor 120 may be configured to control the PWM generator to decrease the duty cycle of the input PWM signal of the buck converter included in the second DC-to-DC converter 511 when the first current voltage exceeds the target voltage and the second current voltage exceeds the target voltage. The processor 120 may be configured to control the PWM generator to increase the duty cycle of the input PWM signal of the buck converter included in the second DC-to-DC converter 511 when the first current voltage does not exceed the target voltage or the second current voltage does not exceed the target voltage.

According to an embodiment, the first antenna module 610 may include the first low-dropout regulator 611, the first DC-to-DC converter (DCDC1) 613, and the first antenna array IC (antenna array IC1) 615. The first DC-to-DC converter 613 may receive power (e.g., VPWR) supplied from the IF PMIC 515, and may supply power to a first power amplifier included in the first antenna array IC 615 using the supplied power (e.g., VPWR). The second antenna module 630 may include the second low-dropout regulator 631, the third DC-to-DC converter (DCDC3) 633, and the second antenna array IC (antenna array IC2) 635. The third DC-to-DC converter 633 may receive power (e.g., VPWR) supplied from the IF PMIC 515, and may supply power to a second power amplifier included in the second antenna array IC 635 using the supplied power (e.g., VPWR).

Figure 7:
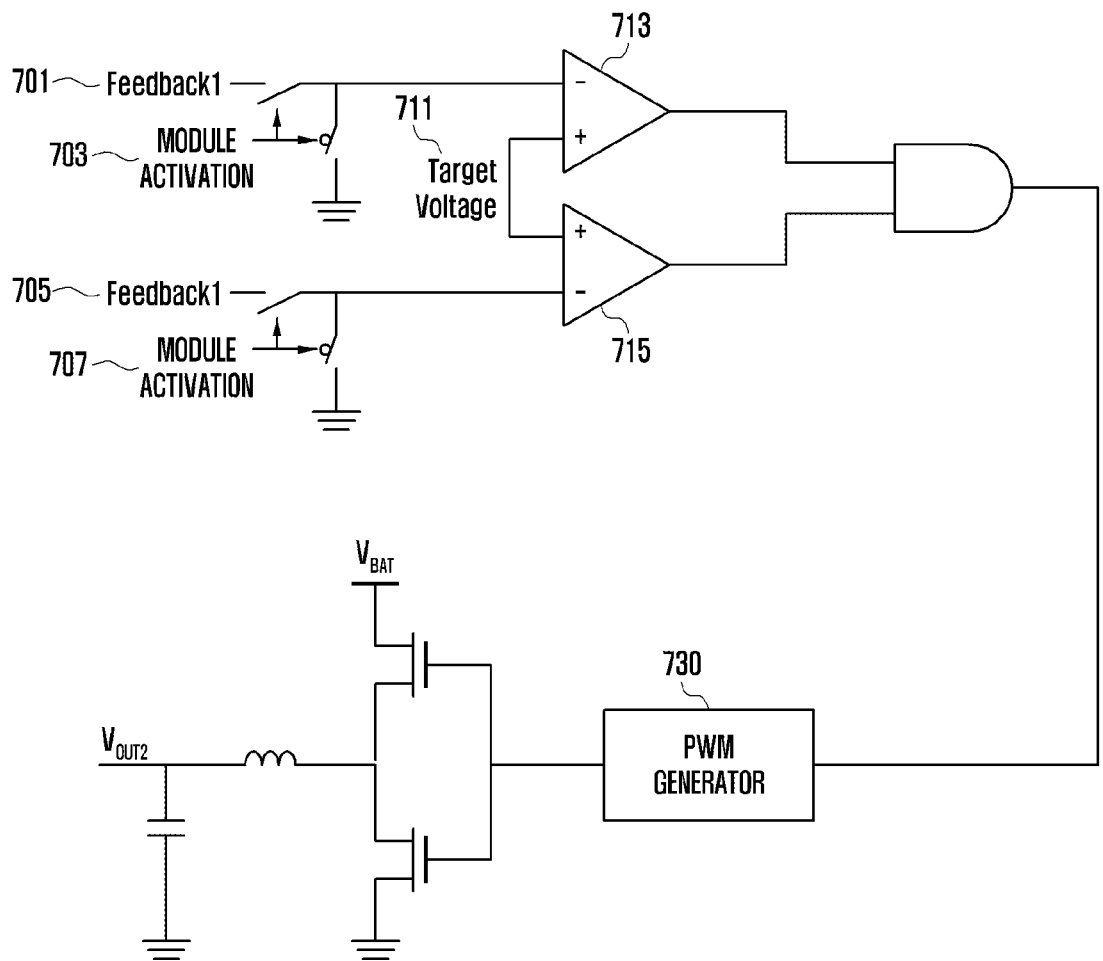
FIG. 7 illustrates a circuit configuration of a second DC-to-DC converter according to various embodiments.

FIG. 7 illustrates an example circuit configuration of a second DC-to-DC converter according to various embodiments.

Referring to FIG. 7, a second DC-to-DC converter (e.g., the second DC-to-DC converter 511 of FIG. 5) according to various embodiments may receive a first feedback signal 701 from a first low-dropout regulator (e.g., the first low-dropout regulator 611 of FIGS. 6A and 6B) included in a first antenna module (e.g., the first antenna module 610 of FIGS. 6A and 6B), and may receive a second feedback signal 705 from a second low-dropout regulator (e.g., the second low-dropout regulator 631 of FIGS. 6A and 6B) included in a second antenna module (e.g., the second antenna module 630 of FIGS. 6A and 6B). The first module activation 703 may refer, for example, to an arrangement for activating the first antenna module 610, and the second module activation 707 may, for example, refer to an arrangement for activating the second antenna module 630. The first module activation 703 or the second module activation 707 may be controlled by a processor (e.g., the processor 120 of FIG. 1). For example, the first module activation 703 or second module activation 707 may include a switch. For example, a switch included in the first module activation 703 may be located between a ground and a conductive line through which the first feedback signal 701 is transmitted. For example, a switch included in the second module activation 707 may be located between a ground and a conductive line through which the second feedback signal 705 is transmitted.

According to various embodiments, the second DC-to-DC converter 511 may compare a first current voltage included in the first feedback signal 701 with a target voltage 711 through a first comparator 713. The second DC-to-DC converter 511 may compare a second current voltage included in the second feedback signal 705 with the target voltage 711 through a second comparator 715. When the first antenna module 610 is activated (e.g., the first module activation 703), the second DC-to-DC converter 511 may output "1" to a PWM generator 730 when the first current voltage exceeds the target voltage 711, and may output "0" to the PWM generator 730 when the first current voltage is equal to or less than the target voltage 711. For example, "1" may indicate decreasing the duty cycle of the input PWM signal and "0" may indicate increasing the duty cycle of the input PWM signal.

According to various embodiments, when the second antenna module 630 is activated (e.g., the second module is activated 707), the second DC-to-DC converter 511 may output "1" to the PWM generator 730 when the second current voltage exceeds the target voltage 711, and may output "0" to the PWM generator 730 when the second current voltage is equal to or less than the target voltage 711. When the first antenna module 610 and the second antenna module 630 are activated, the second DC-to-DC converter 511 may output "1" to the PWM generator 730 when the first current voltage exceeds the target voltage 711 and the second current voltage exceeds the target voltage 711, and may output "0" to the PWM generator 730 when at least one of the first current voltage or the second current voltage is equal to or less than the target voltage 711.

The circuit configuration of the second DC-to-DC converter 511 is only illustrated to help understanding of the disclosure, and the circuit configuration of the second DC-to-DC converter 511 is not limited by FIG. 7.

Figure 8:
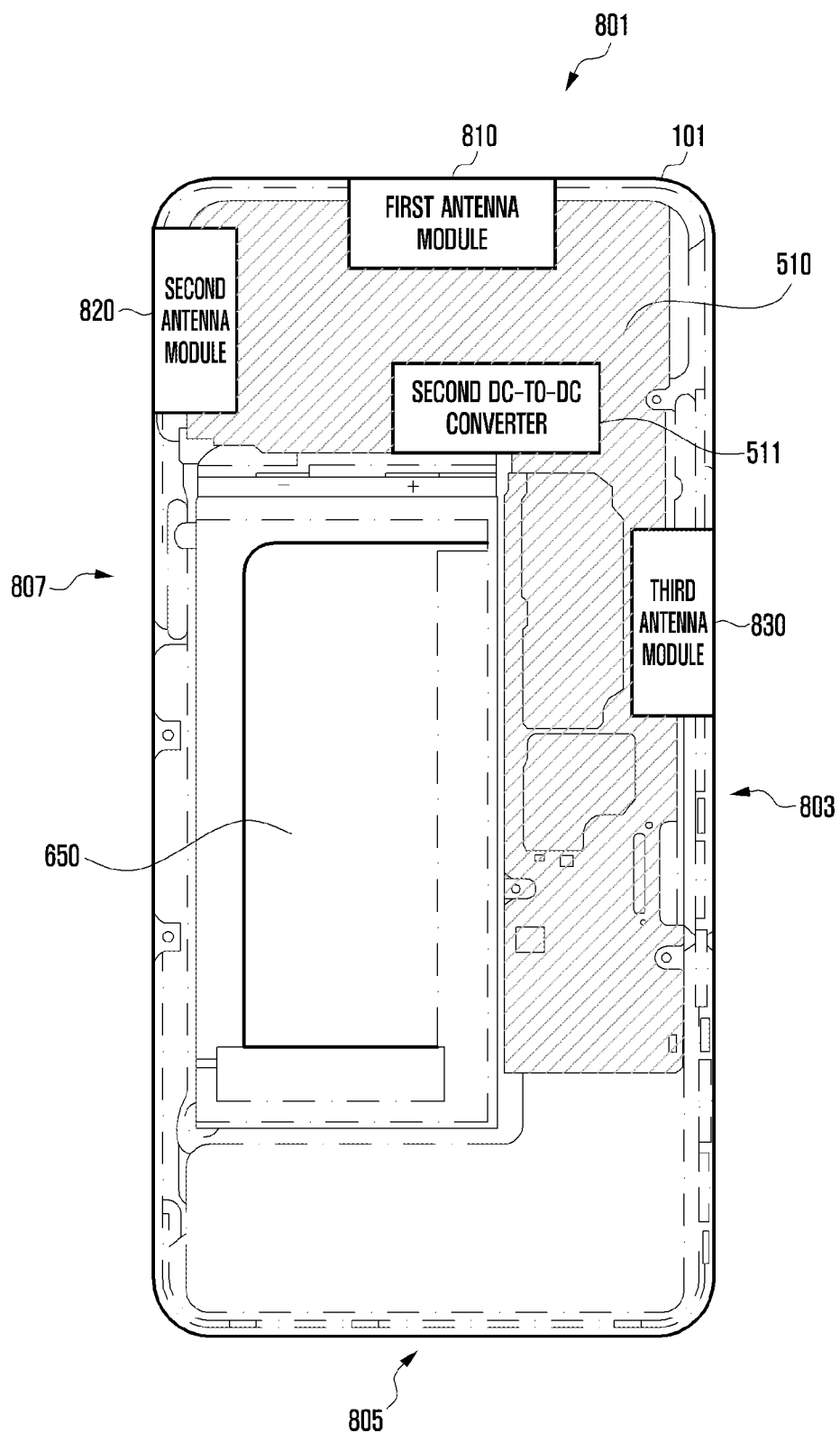
FIG. 8 illustrates a layout structure of a main printed circuit board and an antenna module of an example electronic device according to various embodiments.

FIG. 8 illustrates an example layout structure of a main printed circuit board and an antenna module of an example electronic device according to various embodiments.

Referring to FIG. 8, in an electronic device (e.g., the electronic device 101 of FIG. 1) according to various embodiments, an inner space in a state which a user views a display (e.g., the display module 160 of FIG. 1) at the front or rear side is shown. The electronic device 101 may include a first side surface 801 having a first length, and a second side surface 803 extending in a direction perpendicular to the first side surface 801 and having a second length longer than the first length, a third side surface 805 extending in a direction parallel to the first side surface 801 from the second side surface 803 and having the first length, and a fourth side surface 807 extending in a direction parallel to the second side surface 803 from the third side surface 805 and having the second length. According to an embodiment, the electronic device 101 may include, in an inner space, a battery 650 and a main circuit board 510 disposed in a manner of avoiding the battery 650 or overlapping at least a part of the battery 650. According to an embodiment, the electronic device 101 may include multiple antenna modules 810, 820, and 830 disposed at various positions in an internal space. According to an embodiment, the multiple antenna modules 810, 820, and 830 may be electrically connected to the main circuit board 510. According to an embodiment, all of the multiple antenna modules 810, 820, and 830 may have substantially the same configuration, and may be disposed such that beam pattern formation directions are different at least partially in the inner space of the electronic device 101.

According to various embodiments, the first antenna module 810 may include a low-dropout regulator (e.g., the low-dropout regulator 531 of FIG. 5), a first DC-to-DC converter (e.g., the first DC-to-DC converter 533 of FIG. 5), an antenna array IC (e.g., the antenna array IC 535 of FIG. 5), and an antenna array (e.g., the antenna array 537 of FIG. 5). According to an embodiment, the antenna array may include a patch antenna array or a dipole antenna array. Hereinafter, since the second antenna module 820 and the third antenna module 830 are the same as or similar to the first antenna module 810, detailed descriptions thereof may not be repeated.

According to various embodiments, the first antenna module 810 may be disposed adjacent to a first side surface 801 of the electronic device 101. According to various embodiments, the second antenna module 820 may be disposed adjacent to a fourth side surface 807 of the electronic device 101. According to various embodiments, the third antenna module 830 may be disposed adjacent to a second side surface 803 of the electronic device 101.

According to various embodiments, the second DC-to-DC converter (e.g., the second DC-to-DC converter 511 of FIG. 5) disposed on the main circuit board 510 may supply power to low-dropout regulators included in the multiple antenna modules 810, 820, and 830, respectively. When the first antenna module 810 is activated, the second DC-to-DC converter 511 may receive a first feedback signal from a first low-dropout regulator included in the first antenna module 810, and may compare a first current voltage included in the first feedback signal with a target voltage. When the first current voltage exceeds the target voltage, the second DC-to-DC converter 511 may control a PWM generator to reduce a duty cycle of an input PWM signal of a buck converter according to the control of the processor 120. When the first current voltage is equal to or less than the target voltage, the second DC-to-DC converter 511 may control the PWM generator to increase the duty cycle of the input PWM signal of the buck converter according to the control of the processor 120.

According to various embodiments, when the second antenna module 820 is activated, the second DC-to-DC converter 511 may receive a second feedback signal from a second low-dropout regulator included in the second antenna module 820, and may compare a second current voltage included in the second feedback signal with a target voltage. The second DC-to-DC converter 511 may control a PWM generator to reduce a duty cycle of an input PWM signal of a buck converter according to the control of the processor 120 when the second current voltage exceeds the target voltage. The second DC-to-DC converter 511 may control the PWM generator to increase the duty cycle of the input PWM signal of the buck converter according to the control of the processor 120 when the second current voltage is equal to or less than the target voltage.

According to various embodiments, when the third antenna module 830 is activated, the second DC-to-DC converter 511 receives a third feedback signal from a third low-dropout regulator included in the third antenna module 830 and compares a third current voltage included in the third feedback signal with a target voltage. The second DC-to-DC converter 511 may control a PWM generator to reduce a duty cycle of an input PWM signal of a buck converter according to the control of the processor 120 when the third current voltage exceeds the target voltage. When the third current voltage is equal to or less than the target voltage, the second DC-to-DC converter 511 may control the PWM generator to increase the duty cycle of the input PWM signal of the buck converter according to the control of the processor 120.

According to various embodiments, when the first antenna module 810 and the second antenna module 820 are activated, the second DC-to-DC converter 511 may receive a first feedback signal from a first low-dropout regulator included in the first antenna module 810, receive a second feedback signal from a second low-dropout regulator included in the second antenna module 820, and compare a first current voltage included in the first feedback signal, a second current voltage included in the second feedback signal, and a target voltage. The second DC-to-DC converter 511 may control a PWM generator to reduce a duty cycle of an input PWM signal of a buck converter according to the control of the processor 120 when the first current voltage and the second current voltage exceed the target voltage. When any one of the first current voltage and the second current voltage is equal to or less than the target voltage, the second DC-to-DC converter 511 may control the PWM generator to increase the duty cycle of the input PWM signal of the buck converter according to the control of the processor 120.

According to various embodiments, when the second antenna module 820 and the third antenna module 830 are activated, the second DC-to-DC converter 511 may receive a second feedback signal from a second low-dropout regulator included in the second antenna module 820, receive a third feedback signal from a third low-dropout regulator included in the third antenna module 830, and compare a second current voltage included in the second feedback signal, a third current voltage included in the third feedback signal, and a target voltage. The second DC-to-DC converter 511 may control a PWM generator to reduce a duty cycle of an input PWM signal of a buck converter according to the control of the processor 120 when the second current voltage and the third current voltage exceed the target voltage. When any one of the second current voltage and the third current voltage is equal to or less than the target voltage, the second DC-to-DC converter 511 may control the PWN generator to increase the duty cycle of the input PWM signal of the buck converter according to the control of the processor 120.

According to various embodiments, when the first antenna module 810 and the third antenna module 830 are activated, the second DC-to-DC converter 511 may receive a first feedback signal from a first low-dropout regulator included in the first antenna module 810, receive a third feedback signal from a third low-dropout regulator included in the third antenna module 830, and compare a first current voltage included in the first feedback signal, a third current voltage included in the third feedback signal, and a target voltage. The second DC-to-DC converter 511 may control a PWM generator to reduce a duty cycle of an input PWM signal of a buck converter according to the control of the processor 120 when the first current voltage and the third current voltage exceed the target voltage. When any one of the first current voltage and the third current voltage is equal to or less than the target voltage, the second DC-to-DC converter 511 may control the PWM generator to increase the duty cycle of the input PWM signal of the buck converter according to the control of the processor 120.

According to various embodiments, when the first antenna module 810, the second antenna module 820, and the third antenna module 830 are activated, the second DC-to-DC converter 511 may receive a first feedback signal from a first low-dropout regulator included in the first antenna module 810, receive a second feedback signal from a second low-dropout regulator included in the second antenna module 820, receive a third feedback signal from a third low-dropout regulator included in the third antenna module 830, and compare a first current voltage included in the first feedback signal, a second current voltage included in the second feedback signal, a third current voltage included in the third feedback signal, and a target voltage. The second DC-to-DC converter 511 may control a PWM generator to reduce a duty cycle of an input PWM signal of a buck converter according to the control of the processor 120 when the first current voltage, the second current voltage, and the third current voltage exceed the target voltage. The second DC-to-DC converter 511 may control the PWM generator to increase the duty cycle of the input PWM signal of the buck converter according to the control of the processor 120 when any one of the first current voltage, the second current voltage, and the third current voltage is equal to or less than the target voltage.

In the drawing, it is described that three antenna modules are disposed, but the number of antenna modules may be more or less than three.

An electronic device (e.g., the electronic device 101 of FIG. 1) according to various embodiments may include an antenna module (e.g., the antenna module 530 of FIG. 5) including a low-dropout regulator (LDO) (e.g., the low-dropout regulator 531 of FIG. 5), a first DC-to-DC converter (e.g., the first DC-to-DC converter 533 of FIG. 5), an antenna array IC (e.g., the antenna array IC 535 of FIG. 5), and an antenna array (e.g., the antenna array 537), a second DC-to-DC converter (e.g., the second DC-to-DC converter 511 of FIG. 5) disposed outside the antenna module and configured to supply power to the low-dropout regulator, a power generation circuit (e.g., the power generation module 530 of FIG. 5) configured to supply power to the first DC-to-DC converter and the second DC-to-DC converter, and a processor (e.g., the processor 120 of FIG. 1) operatively connected to the antenna module, the second DC-to-DC converter, and the power generation circuit, wherein the second DC-to-DC converter is configured to establish an electrical path (e.g., the third electrical path 605-1 and the fourth electrical path 605-2 of FIGS. 6A and 6B) for receiving a feedback signal from the low-dropout regulator.

The second DC-to-DC converter may be configured to receive the feedback signal from the low-dropout regulator through the electrical path, and control power supplied to the low-dropout regulator based on a current voltage of the low-dropout regulator included in the feedback signal.

The second DC-to-DC converter may include a comparator configured to compare the current voltage with a target voltage, and a pulse width modulation (PWM) generator configured to control a duty cycle of a pulse width modulation (PWM) signal based on an output of the comparator.

The processor may be configured to control the PWM generator to decrease the duty cycle of the PWM signal in a case that current voltage exceeds the target voltage, and control the PWM generator to increase the duty cycle of the PWM signal in a case that current voltage is equal to or less than the target voltage.

The power generation circuit may be configured to further include a power management integrated circuit (PMIC) and an interface PMIC.

The second DC-to-DC converter is configured to be included inside the PMIC or to be disposed independently of the PMIC and the interface PMIC.

The low-dropout regulator may include a first low-dropout regulator, the antenna array IC may include a first antenna array IC, the antenna array may include a first antenna array, and the antenna module may include a first antenna module, the electronic device may further include a second antenna module including a second low-dropout regulator, a third DC-to-DC converter, a second antenna array IC, and a second antenna array.

The second DC-to-DC converter may be configured to supply a first power to the first low-dropout regulator and supply a second power to the second low-dropout regulator.

The second DC-to-DC converter may be configured to receive a second feedback signal from the second low-dropout regulator, and control the second power supplied to the second low-dropout regulator based on a second current voltage included in the second feedback signal.

The second DC-to-DC converter may include a first comparator configured to compare the first current voltage included in a first feedback signal received from the first low-dropout regulator with a target voltage, a second comparator configured to compare the second current voltage included in a second feedback signal received from the second low-dropout regulator with a target voltage, and a PWM generator (e.g., the PWM generator 730 of FIG. 7) configured to control a duty cycle of a PWM signal based on outputs of the first comparator and the second comparator.

The processor may be configured to control the PWM generator to decrease a duty cycle of the PWM signal in a case that first current voltage and the second current voltage exceed the target voltage, and control the PWM generator to increase the duty cycle of the PWM signal in a case that either the first current voltage or the second current voltage is equal to or less than the target voltage.

A first electrical path between the second DC-to-DC converter and the first low-dropout regulator may be configured to be different from a second electrical path between the second DC-to-DC converter and the second low-dropout regulator.

The length of the first electrical path may be configured to be different from a length of the second electrical path.

The first DC-to-DC converter may be configured to supply power to a power amplifier included in the antenna array IC.

An electronic device according to various example embodiments may include a first antenna module (e.g., the first antenna module 610 of FIGS. 6A and 6B) including a first low-dropout regulator (e.g., the first low-dropout regulator 611 of FIGS. 6A and 6B), a first DC-to-DC converter (e.g., the first DC-to-DC converter 613 of FIGS. 6A and 6B), a first antenna array IC (e.g., the first antenna array IC 615 of FIGS. 6A and 6B), and a first antenna array (e.g., the antenna array 537 of FIG. 5), a second antenna module (e.g., the second antenna module 630 of FIGS. 6A and 6B) including a second low-dropout regulator (e.g., the second low-dropout regulator 631 of FIGS. 6A and 6B), a second DC-to-DC converter (e.g., the third DC-to-DC converter 633 of FIGS. 6A and 6B), a second antenna array IC (e.g., the second antenna array IC 635 of FIGS. 6A and 6B) and a second antenna array (e.g., the antenna array 537 of FIG. 5), a third DC-to-DC converter (e.g., the second DC-to-DC converter 511 of FIG. 5) disposed outside the first and the second antenna modules and configured to supply a first power to the first low-dropout regulator and supply a second power to the second low-dropout regulator, a power generation circuit (e.g., the power management module 188 of FIG. 1) configured to supply power to the first DC-to-DC converter, the second DC-to-DC converter, and the third DC-to-DC converter, and a processor (e.g., the processor 120 of FIG. 1) operatively connected to the first antenna module, the second antenna module, the third DC-to-DC converter, and the power generation circuit, wherein the third DC-to-DC converter is configured to establish a first electrical path (e.g., the third electrical path 605-1 of FIGS. 6A and 6B) for receiving a first feedback signal from the first low-dropout regulator and a second electrical path (e.g., the fourth electrical path 605-2 of FIGS. 6A and 6B) for receiving a second feedback signal from the second low-dropout regulator.

When the first antenna module is activated, the processor may be configured to control the third DC-to-DC converter to supply the first power to the first low-dropout regulator based on a first current voltage included in a first feedback signal received from the first low-dropout regulator.

When the second antenna module is activated, the processor may be configured to control the third DC-to-DC converter to supply the second power to the second low-dropout regulator based on a second current voltage included in a second feedback signal received from the second low-dropout regulator.

When the first antenna module and the second antenna module are activated, the processor may be configured to control the third DC-to-DC converter to supply the first power or the second power to the second low-dropout regulator based on a first current voltage included in a first feedback signal received from the first low-dropout regulator and a second current voltage included in a second feedback signal received from the second low-dropout regulator.

The processor may be configured to control the third DC-to-DC converter to reduce a duty cycle of a PWM signal when the first current voltage and the second current voltage exceed a target voltage, and to control the third DC-to-DC converter to increase the duty cycle of the PWM signal when either the first current voltage or the second current voltage is equal to or less than the target voltage.

Figure 9:
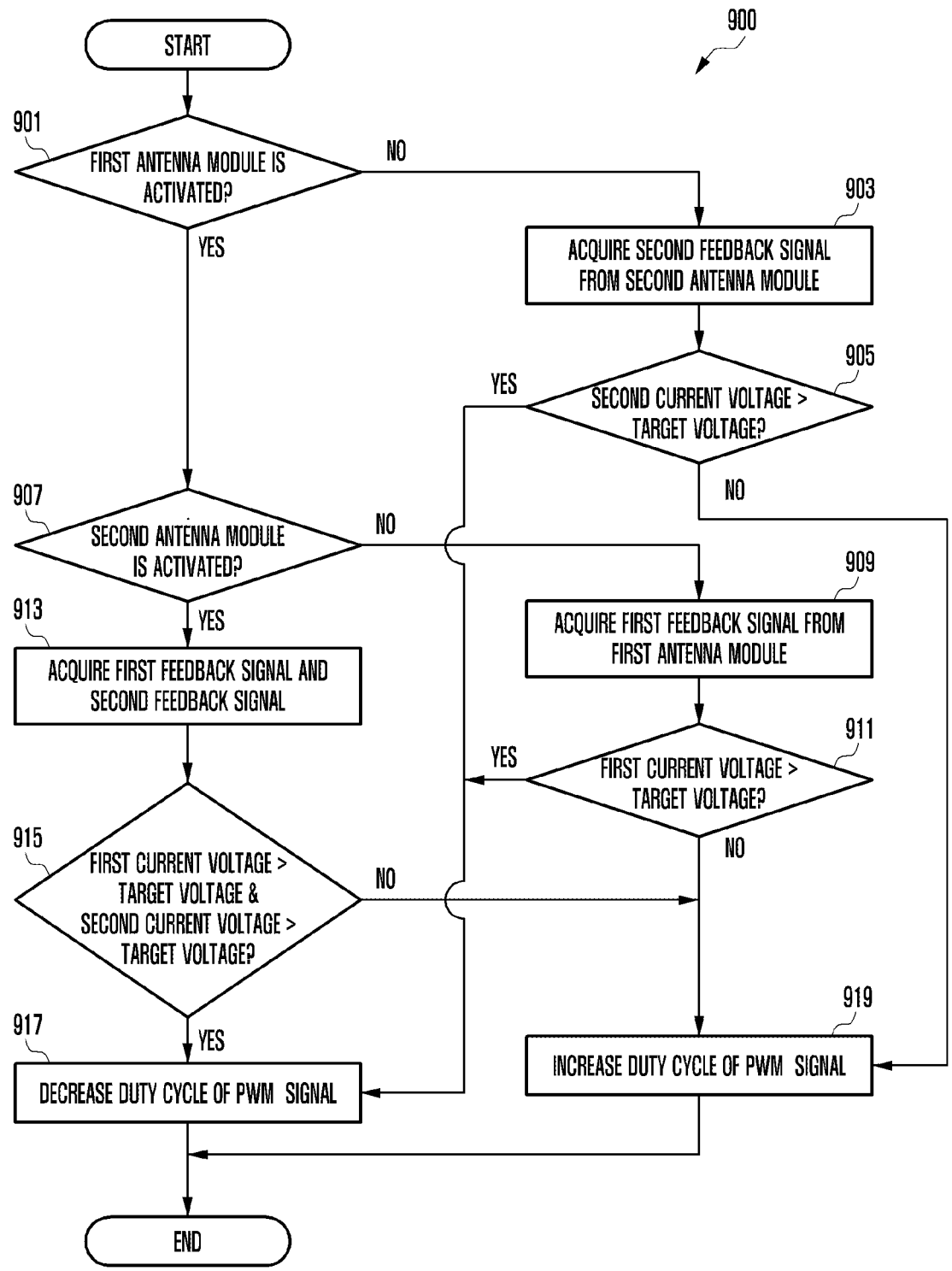
FIG. 9 is a flowchart illustrating an example method for operating an example electronic device according to various embodiments.

FIG. 9 is a flowchart 900 illustrating an example method of operating an example electronic device according to various embodiments.

Referring to FIG. 9, in operation 901, a processor (e.g., the processor 120 of FIG. 1) of an electronic device (e.g., the electronic device 101 of FIG. 1) according to various embodiments may be configured to determine whether a first antenna module (e.g., the first antenna module 610 of FIGS. 6A and 6B) is activated. For example, in the electronic device 101 including two antenna modules, one of the antenna modules may be activated to transmit and receive a radio frequency signal. For example, either the first antenna module 610 or the second antenna module (e.g., the second antenna module 630 of FIGS. 6A and 6B) may be activated. Alternatively, multiple antenna modules may be activated to simultaneously transmit two or more independent radio frequency signals. For example, the first antenna module 610 and the second antenna module 630 may be activated. The processor 120 may be configured to determine an antenna module having been activated among the two antenna modules. The processor 120 may be configured to perform operation 907 when the first antenna module 610 is activated, and perform operation 903 when the first antenna module 610 is not activated.

In the drawing, although operation 901 for determining whether the first antenna module 610 has been activated is shown as being performed first, operation 907 for determining whether or not the second antenna module 630 has been activated may be performed first. Alternatively, operation 901 or operation 907 may be performed simultaneously. This only corresponds to an implementation issue, and the disclosure is not limited by the examples in the description.

When the first antenna module 610 is not activated, the processor 120 may be configured to obtain (or receive) a second feedback signal from the second antenna module 630 in operation 903. For example, when the first antenna module 610 is not activated, the processor 120 may be configured to determine that the second antenna module 630 is activated. The second feedback signal may be obtained from a low-dropout regulator (e.g., the second low drop regulator 631 of FIGS. 6A and 6B) included in the second antenna module 630. The second feedback signal may include, for example, the current voltage (or input voltage) of the second low drop regulator 631.

In operation 905, the processor 120 may be configured to determine whether the second current voltage exceeds a target voltage. The processor 120 may be configured to determine whether a second current voltage included in the second feedback signal exceeds the target voltage. When the second current voltage exceeds the target voltage, the processor 120 may be configured to perform operation 917, and when the second current voltage is equal to or less than the target voltage, the processor 120 may be configured to perform operation 919.

When the first antenna module 610 is activated, in operation 907, the processor 120 may be configured to determine whether the second antenna module 630 has been activated. The processor 120 may be configured to perform operation 913 when the second antenna module 630 is activated, and may perform operation 909 when the second antenna module 630 is not activated.

When the second antenna module 630 is not activated, the processor 120 may be configured to obtain a first feedback signal from the first antenna module 610 in operation 909. The first feedback signal may be obtained from a low-dropout regulator included in the first antenna module 610 (e.g., the first low drop regulator 611 of FIGS. 6A and 6B). The first feedback signal may include, for example, a current voltage (or input voltage) of the first low drop regulator 611.

In operation 911, the processor 120 may be configured to determine whether the first current voltage exceeds the target voltage. The processor 120 may be configured to determine whether a first current voltage included in the first feedback signal exceeds the target voltage. When the first current voltage exceeds the target voltage, the processor 120 may be configured to perform operation 919, and when the first current voltage is equal to or less than the target voltage, the processor 120 may be configured to perform operation 917.

When the first antenna module 610 and the second antenna module 630 are activated, the processor 120 may be configured to obtain a first feedback signal and a second feedback signal in operation 913. The first feedback signal may be obtained from the first low-dropout regulator 611 included in the first antenna module 610. The second feedback signal may be obtained from the second low-dropout regulator 631 included in the second antenna module 630.

In operation 915, the processor 120 may be configured to determine whether a first current voltage exceeds the target voltage and a second current voltage exceeds the target voltage. When the first current voltage and the second current voltage exceed the target voltage, the processor 120 may be configured to perform operation 917, and when either the first current voltage or the second target voltage is equal to or less than the target voltage, the processor 120 may be configured to perform operation 919.

In operation 917, the processor 120 may be configured to control a PWM generator (or a PWM signal generator) to reduce (decrease) a duty cycle of an input PWM signal of a buck converter included in the second DC-to-DC converter 511. The second DC-to-DC converter 511 may be configured to control (or adjust) a voltage provided to the low-dropout regulator included in each antenna module according to the control of the processor 120.

In operation 919, the processor 120 may be configured to control the PWM generator to increase the duty cycle of the input PWM signal of the buck converter. The second DC-to-DC converter 511 may be configured to control (or adjust) a voltage provided to the low-dropout regulator included in each antenna module according to the control of the processor 120.

FIG. 9 illustrates the operation of the electronic device 101 including two antenna modules, and the operation of the electronic device 101 including more than two antenna modules may be similar to the flowchart 900 of FIG. 9.

According to various embodiments, a method for operating an electronic device including one or more antenna modules (e.g., the first antenna module 610 and the second antenna module 630 of FIGS. 6A and 6B) and a second DC-to-DC converter (e.g., the second DC-to-DC converter 511 of FIG. 5) disposed outside the antenna module and configured to supply power to low-dropout regulators included in the one or more antenna modules, respectively, wherein the second DC-to-DC converter is configured to establish an electrical path (e.g., the third electrical path 605-1 and the fourth electrical path 605-2 of FIGS. 6A and 6B) for receiving a feedback signal from each of the low-dropout regulators, may include obtaining a feedback signal from at least one antenna module, comparing a current voltage of a low-dropout regulator included in the acquired feedback signal with a target voltage, and controlling power supplied to each low-dropout regulator from the second DC-to-DC converter based on a result of the comparison.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   first antenna module including a first low-dropout regulator (LDO), a first DC-to-DC converter, first antenna array IC, and a first antenna array;
   a second DC-to-DC converter disposed outside the first antenna module and configured to supply power to the first low-dropout regulator;
   a power generation circuit configured to supply power to the first DC-to-DC converter and the second DC-to-DC converter; and
   a processor operatively connected to the first antenna module, the second DC-to-DC converter, and the power generation circuit,
   wherein the second DC-to-DC converter is configured to establish a first electrical path for receiving a first feedback signal from the first low-dropout regulator.

2. The electronic device of claim 1, wherein the second DC-to-DC converter is configured to:
   receive the first feedback signal from the first low-dropout regulator through the first electrical path; and
   control power supplied to the first low-dropout regulator based on a first current voltage of the first low-dropout regulator included in the first feedback signal.

3. The electronic device of claim 2, wherein the second DC-to-DC converter comprises:
   a first comparator configured to compare the first current voltage with a target voltage; and
   a pulse width modulation (PWM) generator configured to control a duty cycle of a PWM signal based on an output of the first comparator.

4. The electronic device of claim 3, wherein the processor is configured to:
   control the PWM generator to decrease the duty cycle of the PWM signal based on the first current voltage exceeding the target voltage; and
   control the PWM generator to increase the duty cycle of the PWM signal based on the first current voltage being equal to or less than the target voltage.

5. The electronic device of claim 1, wherein the power generation circuit is configured to further include a power management integrated circuit (PMIC) and an interface PMIC.

6. The electronic device of claim 5, wherein the second DC-to-DC converter is configured to be included inside the PMIC or to be disposed independently of the PMIC and the interface PMIC.

7. The electronic device of claim 1, further comprising a second antenna module including a second low-dropout regulator, a third DC-to-DC converter, a second antenna array IC, and a second antenna array.

8. The electronic device of claim 7, wherein the second DC-to-DC converter is configured to supply a first power to the first low-dropout regulator and supply a second power to the second low-dropout regulator.

9. The electronic device of claim 8, wherein the second DC-to-DC converter is configured to:
receive a second feedback signal from the second low-dropout regulator; and
control the second power supplied to the second low-dropout regulator based on a second current voltage included in the second feedback signal.

10. The electronic device of claim 9, wherein the second DC-to-DC converter comprises:
a first comparator configured to compare a first current voltage included in the first feedback signal received from the first low-dropout regulator with a target voltage;
a second comparator configured to compare the second current voltage included in the second feedback signal received from the second low-dropout regulator with the target voltage; and
a PWM generator configured to control a duty cycle of a PWM signal based on outputs of the first comparator and the second comparator.

11. The electronic device of claim 10, wherein the processor is configured to:
control the PWM generator to decrease the duty cycle of the PWM signal based on the first current voltage and the second current voltage exceeding the target voltage; and
control the PWM generator to increase the duty cycle of the PWM signal based on either the first current voltage or the second current voltage being equal to or less than the target voltage.

12. The electronic device of claim 7, wherein the first electrical path between the second DC-to-DC converter and the first low-dropout regulator is configured to be different from a second electrical path between the second DC-to-DC converter and the second low-dropout regulator.

13. The electronic device of claim 12, wherein a length of the first electrical path is configured to be different from a length of the second electrical path.

14. The electronic device of claim 1, wherein the first DC-to-DC converter is configured to supply power to a power amplifier included in the first antenna array IC.

15. An electronic device comprising:
a first antenna module including a first low-dropout regulator, a first DC-to-DC converter, a first antenna array IC, and a first antenna array;
a second antenna module including a second low-dropout regulator, a second DC-to-DC converter, a second antenna array IC, and a second antenna array;
a third DC-to-DC converter disposed outside the first and the second antenna modules and configured to supply a first power to the first low-dropout regulator and supply a second power to the second low-dropout regulator;
a power generation circuit configured to supply power to the first DC-to-DC converter, the second DC-to-DC converter, and the third DC-to-DC converter; and
a processor operatively connected to the first antenna module, the second antenna module, the third DC-to-DC converter, and the power generation circuit,
wherein the third DC-to-DC converter is configured to establish a first electrical path for receiving a first feedback signal from the first low-dropout regulator and a second electrical path for receiving a second feedback signal from the second low-dropout regulator.

16. The electronic device of claim 15, wherein, when the first antenna module is activated, the processor is configured to control the third DC-to-DC converter to supply the first power to the first low-dropout regulator based on a first current voltage included in the first feedback signal received from the first low-dropout regulator.

17. The electronic device of claim 15, wherein, when the second antenna module is activated, the processor is configured to control the third DC-to-DC converter to supply the second power to the second low-dropout regulator based on a second current voltage included in the second feedback signal received from the second low-dropout regulator.

18. The electronic device of claim 15, wherein, when the first antenna module and the second antenna module are activated, the processor is configured to control the third DC-to-DC converter to supply the first power or the second power to the second low-dropout regulator based on a first current voltage included in the first feedback signal received from the first low-dropout regulator and a second current voltage included in the second feedback signal received from the second low-dropout regulator.

19. The electronic device of claim 18, wherein the processor is configured to control the third DC-to-DC converter to reduce a duty cycle of a PWM signal when the first current voltage and the second current voltage exceed a target voltage, and to control the third DC-to-DC converter to increase the duty cycle of the PWM signal when either the first current voltage or the second current voltage is equal to or less than the target voltage.

20. A method for operating an electronic device, the electronic device comprising one or more antenna modules, and a DC-to-DC converter disposed outside the one or more antenna modules and configured to supply power to low-dropout regulators included in the one or more antenna modules, respectively, wherein the DC-to-DC converter is configured to establish an electrical path for receiving a feedback signal from each of the low-dropout regulators, the method comprising:
obtaining a feedback signal from at least one antenna module;
comparing a current voltage of a low-dropout regulator included in the obtained feedback signal with a target voltage; and
controlling power supplied to each low-dropout regulator from the DC-to-DC converter, based on a result of the comparing.

* * * * *